March 28, 1950     H. G. CUMMINGS     2,501,664
SELF-CLINCHING NAIL
Filed Aug. 20, 1945     2 Sheets-Sheet 1
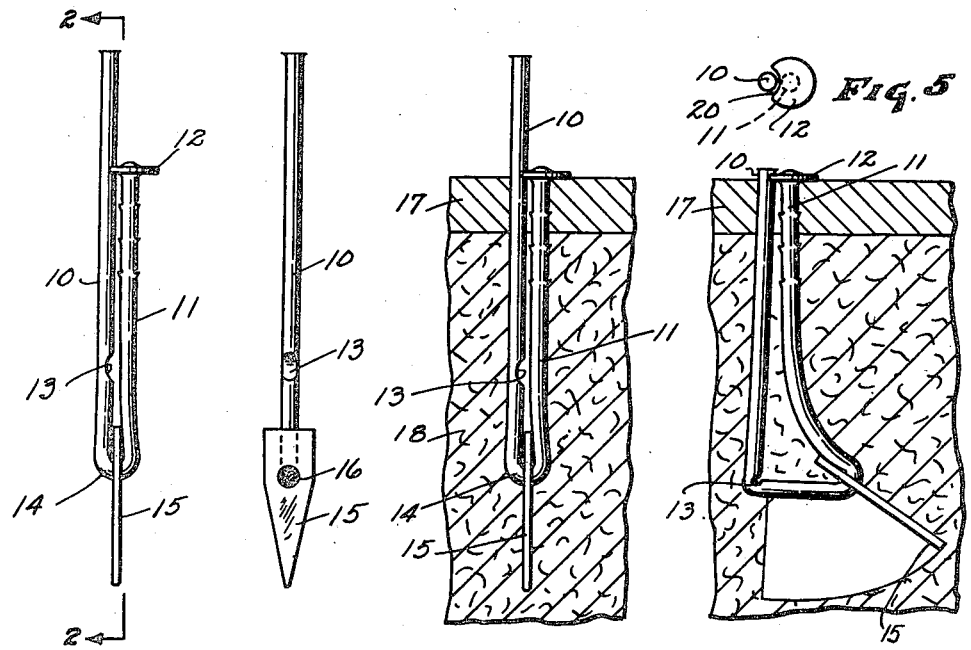
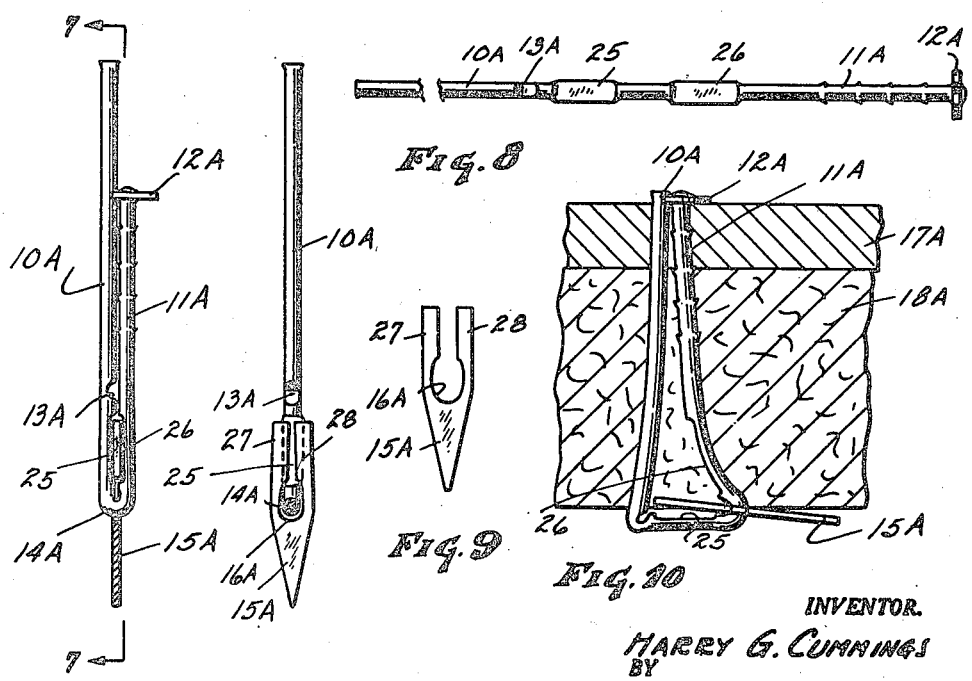
INVENTOR.
HARRY G. CUMMINGS
BY
Bates, Team, & McLean
ATTORNEYS March 28, 1950     H. G. CUMMINGS     2,501,664
SELF-CLINCHING NAIL Filed Aug. 20. 1945     2 Sheets-Sheet 2

INVENTOR.
HARRY G. CUMMINGS
BY
Bates, Teare, & McDean
ATTORNEYS

Patented Mar. 28, 1950

2,501,664

UNITED STATES PATENT OFFICE 2,501,664

SELF-CLINCHING NAIL

Harry G. Cummings, New York, N. Y.

Application August 20, 1945, Serial No. 611,502

12 Claims. (Cl. 85—23)

This invention relates to a fastening device of the type generally known as a self-clinching nail, which comprises a member so formed that it may be driven into a support and will automatically clinch itself either on the interior of the support or on the inner side thereof. The invention comprises an improvement on Patent No. 2,355,955 which was issued to me on August 15, 1944.

I have found that whenever a self-clinching nail made in accordance with the invention set forth in my Patent No. 2,355,955 aforesaid, is driven into fibrous insulating material there is a tendency for the material to pile up against the leading edge of the nail and thereby detract from the satisfactoriness of the fastener in the clinching characteristic thereof. An object of the present invention, therefore, is to provide a self-clinching nail of the character set forth in the aforesaid patent, but wherein provision is made for enabling the nail to be readily driven into fibrous material in an easy and expeditious manner.

An additional object of the invention is to provide a self-clinching nail which has a sharp pointed leading edge that enables the nail to be driven readily into any suitable material, and that will not in any way detract from the self-clinching features that are desirable in a nail of this character.

Figure 11:
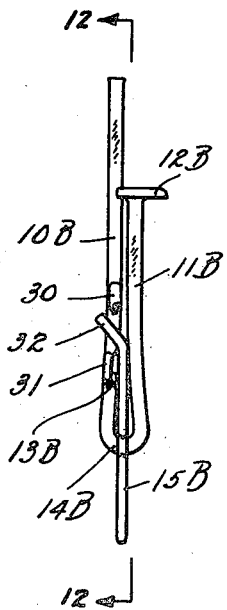
Figure 12:
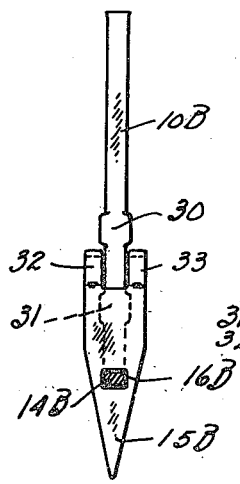
Figure 13:
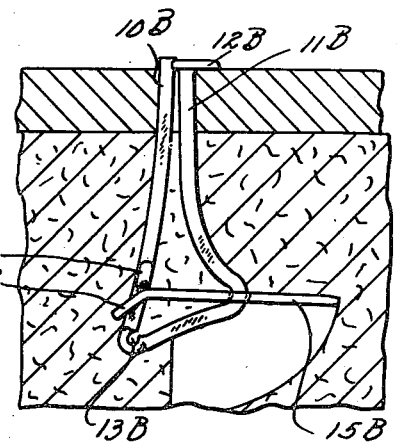
Figure 14:
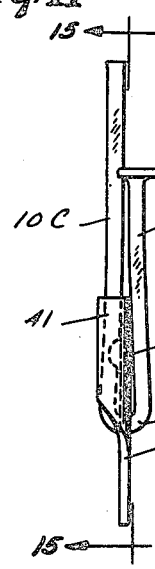
Figure 15:
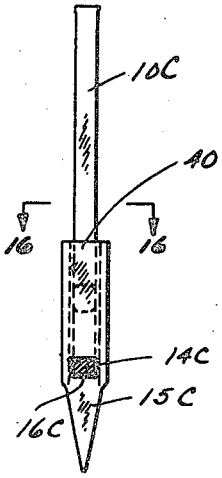
Figure 16:
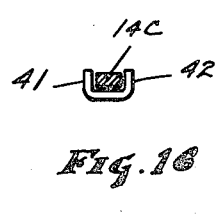

Various modifications of this invention are shown in the drawings, wherein Fig. 1 is a side elevation of a nail embodying the present invention; Fig. 2 is a section taken on a plane indicated by the line 2—2 in Fig. 1; Fig. 3 is an elevational view of the nail showing it driven part way into the material which is shown in section; Fig. 4 is a similar view showing the nail completely driven and clinched; Fig. 5 is a top plan view of the nail; Fig. 6 is a side elevation, partly in section, showing a modified form of nail construction; Fig. 7 is a section taken on a plane indicated by the line 7—7 in Fig. 6; Fig. 8 is an elevational view of the partially formed blank from which the nail of Fig. 6 is made; Fig. 9 is an elevational view of the part which forms the point in the nail assembly of Fig. 6; Fig. 10 is an elevational view of the nail of Fig. 6, showing it completely driven and clinched, with the clinch taking place on the inner side of the material through which the nail is driven; Fig. 11 is a side elevation of another modified form of construction; Fig. 12 is a section taken on a plane indicated by the line 12—12 in Fig. 11; Fig. 13 is a side elevation showing the nail of Fig. 11 completely driven and clinched through material which is shown in section; Fig. 14 is a side elevation of another modification of the invention; Fig. 15 is a section taken on a plane indicated by the line 15—15 in Fig. 14, and Fig. 16 is a section taken on the line 16—16 in Fig. 15.

The fastener embodying the present invention is a two-piece construction wherein one piece comprises the legs and the other comprises the point of the device. In the illustration of Figs. 1 to 5, inclusive, the leg member embodies a single integral piece bent intermediately to provide a main or driving leg 10 and a shorter or headed leg 11, the upper end of which is provided with a head 12. The leg 10 projects beyond the upper end of the head in the normal undriven position and has a weakened portion in the form of a notch 13, a short distance above the connecting portion 14. The point member comprises a single piece of sheet metal 15, which has an aperture 16 through which the leg member is threaded, so that the final assembly is as shown in Figs. 1 and 2.

The nail with the pointed end thereof leading is driven into the work which is shown in Fig. 3 as a layer of any suitable building siding material 17, and insulating material 18, until the head abuts the outer surface of the layer 17. The driving is accomplished by striking the upper end of the driving leg with a hammer in the usual way. When motion of the leg 11 is arrested by engagement of the head against the material 17, continued blows against the projecting end of the leg 10 will cause the driving leg to bend at the weakened portion 13 and gradually swing its lower portion in the direction toward the shorter leg, with consequent bending and deflection of the shorter leg, until the legs come into the position indicated in Fig. 4. In this travel from the position of Fig. 3 to that of Fig. 4, the point 15 plows through the insulating material and finally assumes such position as indicated in Fig. 4, where the head of the point member 15 beyond the aperture 16 bears against the underside of the deflected shorter leg. The device is thus effectively clinched within the insulating material. In Fig. 5 the head is shown as being notched at 20 to permit the driving leg to be maintained in close proximity to the headed leg.

A modification of the invention is shown in Figs. 6 to 10 wherein parts that correspond with Figs. 1 to 5 have the same numbers, but with the suffix "A." The leg member has flat portions 25 and 26 on the driving and headed legs respectively, and such flattened portions are disposed between the connecting portion 14 and the weakened portion 13. The flattened portions form registering recesses when the leg member is bent to the form shown in Fig. 6, and the recesses cooperate to form a cavity which accommodates the upper portion of the pointed member 15A. In this modification the upper portion is bifurcated from the aperture 16A to provide fingers 27 and 28 which may be bent inwardly towards each other as illustrated in Fig. 7, after the point has been assembled onto the leg member.

In the modification of Figs. 11 to 13, parts which correspond to Figs. 1 to 4, inclusive, have the same numbers but with the suffix "B." This form, however, differs from that of Figs. 1 to 4, by utilization of flat portions 30 and 31, the latter of which is adjacent the weakened portion 13B, and the former of which is between the weakened portion and the driving end of the leg 10B. If desired, the leg member may be rectangular in cross-section, as shown by the connecting part 14B in Fig. 12, and by a complementary shaped aperture 16B in the pointed member 15B. The pointed member additionally has fingers 32 and 33 which are disposed adjacent the upper end thereof and are bent out of the plane thereof in a direction away from the short leg 11B. The inner edges of the fingers 32 and 33 are in close proximity to the sides of the leg 10B and, therefore, act as cams when engaged by the shoulders that are formed by the flat portions 30 whereby lateral shifting of the pointed member into clinching position is facilitated.

A further modification is illustrated in Figs. 14 to 16, wherein the corresponding parts have the same reference characters but with the suffix "C." In this modification the driving leg has the weakened portion in the manner of that shown in Fig. 1, but the pointed member has the upper part 40 thereof projecting above the weakened portion and has the longitudinal edges bent laterally out of the plane thereof, as at 41 and 42 respectively, to embrace the side edges of the driving leg and to form a channel-shaped construction as is illustrated in Fig. 16. In this arrangement the point is firmly locked against any sidewise movement with respect to the leg member and, therefore, is capable of being driven into clinching position in relatively dense material.

An advantage of the present invention is the fact that it retains the simplicity of formation of the leg member as is illustrated in my aforesaid Patent No. 2,355,955, coupled with the utilization of a driving point that will easily penetrate relatively dense insulating material, that otherwise might pile up in front of the leading end of the leg member when used alone. The various modifications of the invention are useful in assuring a satisfactory clinching action when used in connection with materials of different density.

I claim:

1. A self-clinching nail having a pair of substantially parallel legs connected by a return bend, one leg being longer than the other, the shorter leg having a head, and a flat pointed member having an aperture through which the return bend extends with the head of the pointed member lying between the legs and the point projecting beyond the bend.

2. A self-clinching nail having a pair of substantially parallel legs connected by a return bend, one leg being longer than the other, the shorter leg having a head, and a separate elongated member having an aperture through which the return bend extends so that a portion of the separate member lies between the legs and a portion projects beyond the bend, the longer leg being of reduced thickness in a local region above the inner end of said separate member.

3. A self-clinching nail having a pair of substantially parallel legs connected by a return bend, one leg being longer than the other, the shorter leg having a head, and a projecting member having an aperture through which the return bend extends, said aperture extending at a reduced width to the inner end of the apertured member.

4. A self-clinching nail comprising a member bent intermediately by a U-bend to provide a driving leg and a shorter headed leg, each of said legs having a weakened portion thereon spaced from the U-bend to facilitate bending when driven into the work, and a pointed member comprising a separate strip having an aperture therein through which the U-bent portion of the leg member extends.

5. A self-clinching nail comprising a member bent intermediately to provide two legs side by side, one longer than the other and the shorter leg provided with a head, and a pointed member having an aperture through which said member is threaded, the pointed member being bifurcated adjacent the upper end thereof, and the bifurcated portion having two spaced arms extending between the legs and providing an interlock therewith.

6. A self-clinching nail comprising a strip of metal bent intermediately to provide a driving leg and a shorter headed leg, the driving leg having a portion of reduced thickness, one of said legs having a flat portion thereon, and a pointed member carried by the strip and having a pair of fingers extending between the legs of the strip and adapted to coact with said flat portion to provide an interlock therewith.

7. A self-clinching nail comprising a strip of metal bent intermediately to provide a driving leg and a shorter headed leg, the driving leg having a portion of reduced thickness thereon, and having a shouldered portion disposed thereabove, and a pointed member carried by the first-mentioned member extending between the legs thereof and having an offset part adapted to coact with said shoulder to facilitate movement of the pointed member into clinching position during the driving operation.

8. A self-clinching nail comprising a strip bent intermediately by a U-bend to provide a driving leg and a shorter headed leg, a pointed member carried by said strip adjacent the U-bend portion thereof, said member having a portion thereof projecting above the U-bent portion of the strip and having the longitudinally extending side edges thereof offset laterally and embracing said driving leg.

9. A self-clinching nail having a pair of substantially parallel legs connected by a return bend, one leg being longer than the other, the shorter leg having a head, and a member having an aperture through which the return bend extends with the upper portion of the apertured member lying between the legs and the free portion projecting beyond the bend, the longer leg having a flattened portion on the inner side of the leg and the apertured member extending along said flattened portion.

10. A self-clinching nail having a pair of substantially parallel legs connected by a return bend, one leg being longer than the other, the shorter leg having a head, and a pointed member having an aperture through which the return bend extends with the upper portion of the pointed member lying between the legs and the point projecting downwardly beyond the bend, said upper portion being bifurcated and bent laterally to engage opposite sides of the longer leg.

11. A self-clinching nail composed of two members, the first member comprising an elongated strip of metal bent intermediately by a U-bend to provide two legs lying alongside of each other substantially parallel and comparatively close together, one of said legs being longer than the other and the shorter leg being provided with a head adapted to limit insertion of the nail, the second member of said nail comprising a flat strip of metal having an aperture through it and pointed beyond the aperture, the U-bent portion of the first member extending through the aperture, said second member extending in a direction lonigtudinal of the first member and having its upper portion extending between the two legs of the first member and positioned thereby, the lower portion of said second member being pointed and extended downwardly beyond said U-bend.

12. A two-piece self-clinching nail, one of said pieces comprising a strip bent intermediately by a U-bend to provide two legs of dissimilar length, the shorter leg having a head, and the other piece consisting of a strip fastened to the first piece adjacent the U-bend portion thereof and having a part thereof extending lengthwise of the leg member above the U-bend and a part projecting below the U-bend and pointed at the free end.

HARRY G. CUMMINGS.

REFERENCES CITED

The following references are of record in the file of this patent:

UNITED STATES PATENTS

| Number | Name | Date |
|---|---|---|
| 254,397 | Smith | Feb. 28, 1882 |
| 578,100 | Hay | Mar. 2, 1897 |
| 631,138 | Timmons | Aug. 15, 1899 |
| 642,169 | Stokes | Jan. 30, 1900 |
| 855,298 | Frost | May 28, 1907 |
| 964,226 | Farrand | July 12, 1910 |
| 1,047,097 | McNab | Dec. 10, 1912 |
| 1,146,191 | Mann | July 13, 1915 |
| 1,244,133 | Saunders | Oct. 23, 1917 |
| 1,566,846 | Fielding | Dec. 22, 1925 |
| 2,156,021 | Little | Apr. 25, 1939 |
| 2,231,178 | Beckwith | Feb. 11, 1941 |

FOREIGN PATENTS

| Number | Country | Date |
|---|---|---|
| 279,747 | Great Britain | Nov. 3, 1927 |